May 19, 1936.  A. L. WRIGHT  2,041,630
APPARATUS FOR HEATING LIQUIDS
Filed Oct. 23, 1934
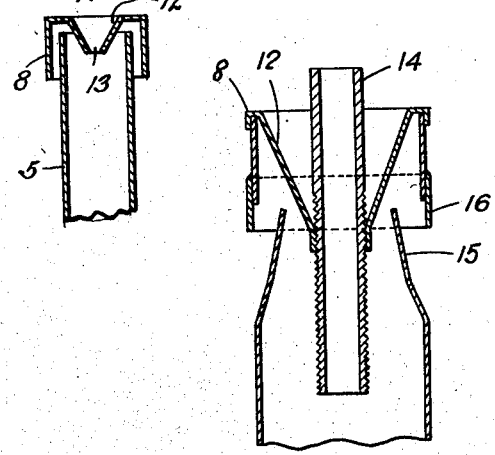
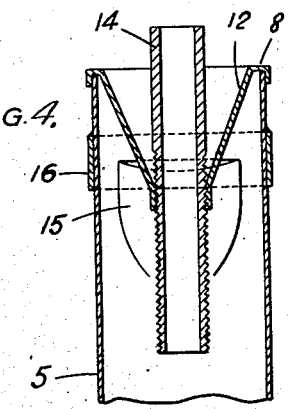
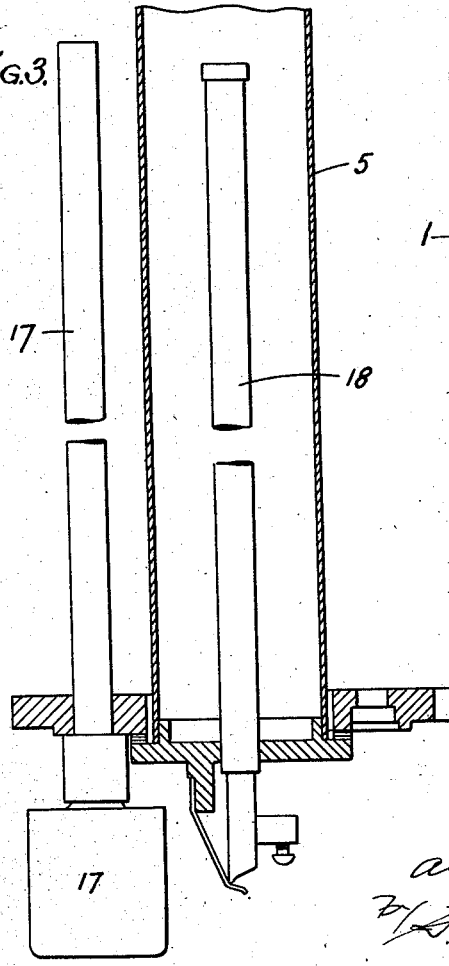
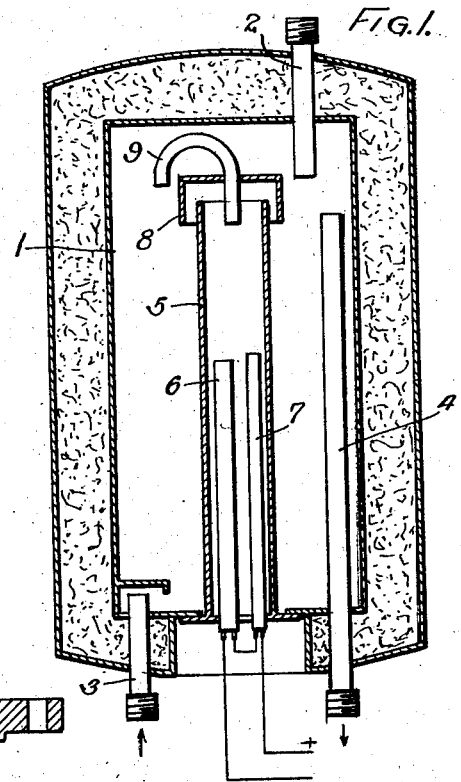

Patented May 19, 1936

2,041,630

UNITED STATES PATENT OFFICE 2,041,630

APPARATUS FOR HEATING LIQUIDS

Alan Leslie Wright, Kingston-on-Thames, England

Application October 23, 1934, Serial No. 749,664
In Great Britain November 15, 1933

7 Claims. (Cl. 122—33)

This invention relates to water heaters of the type in which the water in a tank is heated by means of a quantity of hot liquid contained in an inner vessel and directly heated by suitable heating means.

While the invention is particularly suitable for use with electrically heated water heaters it is not limited to such heaters, but any suitable heating agent may be employed.

In known heaters, means have been provided for maintaining the liquid levels of the inner vessel and the tank at heights which do not permit open circulation between the water in the inner vessel and the tank and thus the deposition of scale upon the heating elements is greatly reduced. In known heaters the means for controlling the levels usually consist of pipes which enter the two chambers and are connected to the outer atmosphere.

In certain of the known apparatus the replenishment of the liquid in the inner vessel is uncertain when the demands on the apparatus are heavy and in others it is essential even with closed tanks that pipes connected to the outer atmosphere have one end in the liquid in the inner vessel with consequent large heat losses.

It is an object of the present invention to provide apparatus which avoids the aforesaid disadvantages and a further important object is to provide apparatus which can be applied to existing heaters with little or no alteration to such heaters and which is readily fixed in or removed from its position in the heater.

According to the invention, water heating apparatus having a tank and an inner vessel open at the top and closed at the bottom containing the heating means comprises a cap or cowl spaced from the inner vessel and disposed above the open top thereof and provided with sides which extend downwardly to the level of the upper edge of the wall of the inner vessel, means for introducing water to the tank outside the inner vessel and means for providing an open connection between the space within the cowl and the tank space, said connecting means having its outer mouth opening to the tank space at a level above the level of the upper edge of the wall of the inner vessel and its inner mouth opening within the inner vessel.

The invention will be described with reference to the accompanying drawing in which:—

Figs. 1 and 2 are diagrammatic sectional elevations illustrating different forms of construction.

Figs. 3 and 4 are a sectional front elevation and a sectional side elevation respectively of apparatus constructed according to the invention.

Referring to the drawing, 1 is a closed tank having an air vent or expansion pipe 2. A cold water inlet 3 and hot water outlet 4 are provided at suitable points. An inner vessel 5 is conveniently arranged to be inserted in the tank 1 through the bottom thereof and contains a heating element 6, and if desired a thermostatic device 7. The latter may be arranged outside the vessel 5 if desired. The vessel 5 is open at the top and above it is arranged a cap or cowl 8. The cowl 8 is spaced from the vessel 5 and its sides extend downwardly at least as far as the level of the top edge of the wall of the vessel 5. In practice it will be found convenient to carry the sides down well below the level described for reasons which will be apparent from the following description. The cowl is conveniently supported by the vessel 5 but may be attached to supports carried on the tank. Passing upwards through the cowl 8 is an inverted U-tube 9. The tube 9 inside the cowl is carried downwards towards the vessel 5 at least as far as the level of the top edge of the wall thereof, and usually below this level. The outer end of the tube 9 opens to the tank space at a level above that of the level of the top edge of the wall of the vessel 5. A vent pipe 2 is conveniently arranged in the closed tank construction shown. This pipe is not, of course, necessary in the case of an open tank construction. Water is introduced in the construction shown in Fig. 1, as well as in all other constructions according to the invention, to the tank space outside the inner vessel 5, and must not be introduced first to the inner vessel so as to fill the tank from the inner vessel. When water is introduced to the outer tank, the level rises until it reaches first the lower edge of the cowl sides and the top of the wall of the inner vessel 5. As the U-tube 9 prevents the formation of an air-lock at this stage, water flows into the inner vessel until it reaches and seals the inner opening of the U-tube 9. Air is then trapped within the cowl. The water in the outer tank eventually reaches and seals the outer mouth of the U-tube 9 and a quantity of air is trapped in this tube also. In the case of a closed tank the adjustment of the position of the lower end of the vent tube 2 will determine the level of water in the tank so that an air cushion may be formed above the level of the cowl if desired. The level of water in the inner vessel may be adjusted by setting the inner mouth of the tube 9 to different levels within the vessel. The arrangement described is applicable to apparatus where the water to be heated is introduced to the storage tank from above as in cistern type heaters which employ a superposed feed tank controlled by a ball valve. In the case of cistern type heaters the feed water may be introduced into a recessed portion formed in the top of the cowl. It will be appreciated that the feed water introduced from above to the recessed portion overflows from this portion into the outer tank space. This construction is advantageous when cold water is admitted from the top of the tank at a slower rate than hot water is drawn off from the bottom. The recessed portion which may be, for example, conical in form is arranged to extend downwardly so that the lowest part is within the liquid in the inner vessel. The incoming cold water is thus heated in the recessed cowl before it enters the outer tank space. This arrangement also prevents boiling in the inner vessel and provides a relatively cool surface within the inner vessel upon which vapour may condense and run back into the vessel.

In the construction shown in Fig. 2, the cowl 8 is arranged in relation to the inner vessel as described above. The cowl top is recessed as shown and the recessed portion 12 is carried downwards to a level within the inner vessel 5. An opening 13 is formed in the portion 12. In operation the water entering the vessel 5 from the tank 1 during filling rises and closes the opening 13, thus trapping air within the cowl 8, the level of the liquid in the vessel 5 being determined by the level of the opening 13. Means are provided for maintaining the level in the outer tank space below the level of the cowl top. Such means may, in a closed tank, comprise an air vent or overflow tube. The level may, of course, be controlled by a ball valve.

A construction of an inner vessel and cowl built as a unit adapted to be inserted easily in a storage tank is shown in Figs. 3 and 4. The vessel 5 is constructed with its wall extending upwards to the top of the cowl, as shown more clearly in Fig. 4. The top of the cowl 8 which is shown with a conical recessed portion 12, is attached to the side wall of the vessel 5. At opposite portions 4 the side wall is cut and portions 15 are bent inwards as shown in Fig. 3. A band 16 is attached to the cowl thus formed to bring the sides down to the desired level in relation to the top edges of the portions 15. The recessed portion 12 is bored and an upwardly extending tube 14 is fitted, suitably by screwing. The lower mouth of the tube 14 is arranged at a level well below the top of the vessel 5 while the top mouth of the tube 14 is always above the level of the water in the tank. The level of the water in the tank is controlled by suitable means. A thermostatic device 17 is arranged outside the vessel 5, the heating element 18 being, of course, inside this vessel.

It will be appreciated that in the constructions described, the loss of heat from the inner vessel or heating chamber is reduced to a minimum by the arrangements used to control the levels in the two vessels, while open circulation can be prevented effectively.

Having thus described the nature of the said invention and the best means I know of carrying the same into practical effect, I claim:—

1. Water heating apparatus having a tank and an inner vessel open at the top and closed at the bottom containing the heating means comprising a cap or cowl spaced from the inner vessel and disposed above the open top thereof and provided with sides which extend downwardly below the level of the upper edge of the wall of the inner vessel, means for introducing water to the tank outside the inner vessel and means providing an open connection between the space within the inner vessel and the tank space, said connecting means having its outer mouth opening to the tank space at a level above the level of the upper edge of the wall of the inner vessel and its inner mouth opening to the inner vessel at a level below the level of the said upper edge.

2. Water heating apparatus as claimed in claim 1, in which said connecting means is an inverted U-tube open at both ends and which is arranged with one end within the inner vessel and below the level of the upper edge of the wall of the inner vessel and the other end in the tank space at a level above said edge.

3. Water heating apparatus as claimed in claim 1, in which the cap or cowl has a recessed top, the bottom of the recess extending into the inner vessel, and said connecting means is a port formed in the recessed portion within the inner vessel, and means for preventing the water level of the tank from rising above the top of the cowl.

4. Water heating apparatus as claimed in claim 1, in which the cap or cowl is provided with a recessed top, the bottom of the recess extending into the inner vessel, and said connecting means comprises an open tube which passes through in gas-tight connection with the recessed portion to the inner vessel and extends upwards into the tank space, means being provided to prevent the water level in the tank from rising above the top of the upwardly extending tube.

5. Water heating apparatus as claimed in claim 1, in which the means connecting the space within the cowl and the tank space comprises an upwardly extending tube which passes through the cowl means being provided to prevent the water level in the tank from rising above the top of the upwardly extending tube.

6. Water heating apparatus having a tank and an inner vessel open at the top and closed at the bottom containing the heating means comprising a cap or cowl having a recessed top extending into the inner vessel, the cap being disposed above the open top thereof and provided with sides which extend downwardly below the level of the upper edge of the wall of the inner vessel, means for introducing water to the tank outside the inner vessel, an open tube passing through in gas-tight connection with the recessed portion of the cap to the inner vessel and extending upwards into the tank space, and means for preventing the water level in the tank from rising above the top of the tube.

7. Water heating apparatus having a closed tank, an air vent therein opening into the upper part of the tank, an inner vessel open at the top and closed at the bottom containing the heating means comprising a cap or cowl having a recessed top extending into the inner vessel, the cap being disposed above the open top thereof and provided with sides which extend downwardly below the level of the upper edge of the wall of the inner vessel, means for introducing water to the tank outside the inner vessel, an open tube passing through, in gas-tight connection with the recessed portion of the cap, to the inner vessel and extending upwards into the tank space and means for preventing the water level in the tank from rising above the top of the tube.

ALAN LESLIE WRIGHT.